Feb. 23, 1965  F. G. DANHIER  3,171,013
PROCESS AND APPARATUS FOR JOINING STEEL WORK
BY AUTOMATIC AND SEMI-AUTOMATIC
ELECTRIC ARC WELDING
Filed Dec. 7, 1962  3 Sheets-Sheet 1
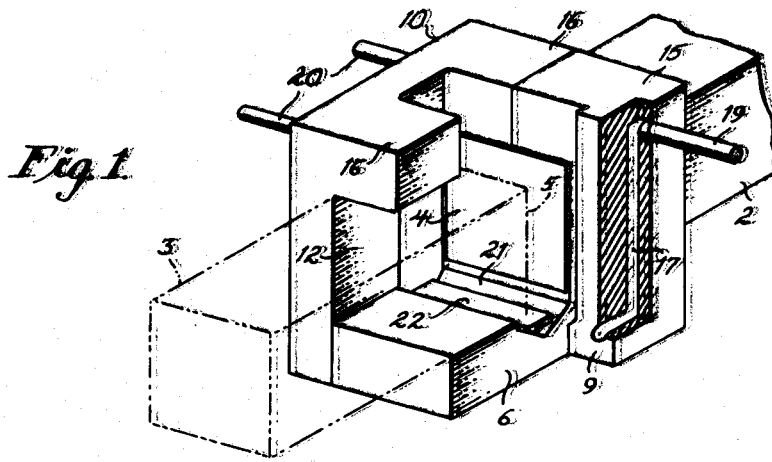
Fig. 1
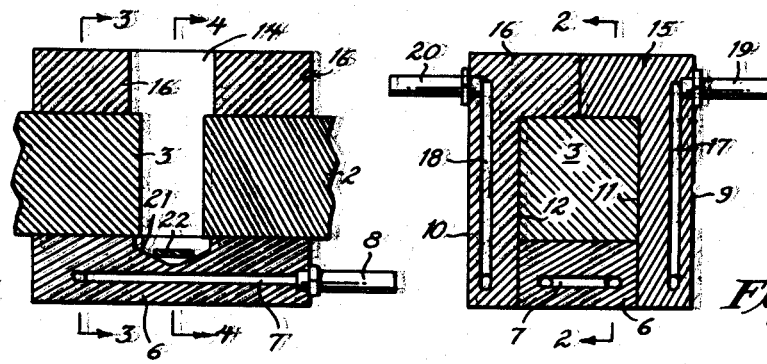
Fig. 2.  Fig. 3.
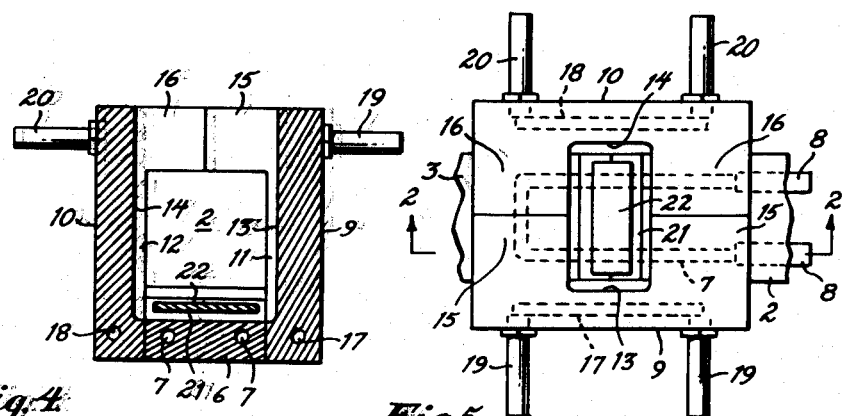
Fig. 4.  Fig. 5.
INVENTOR
Francois Georges Danhier
BY
ATTORNEYS

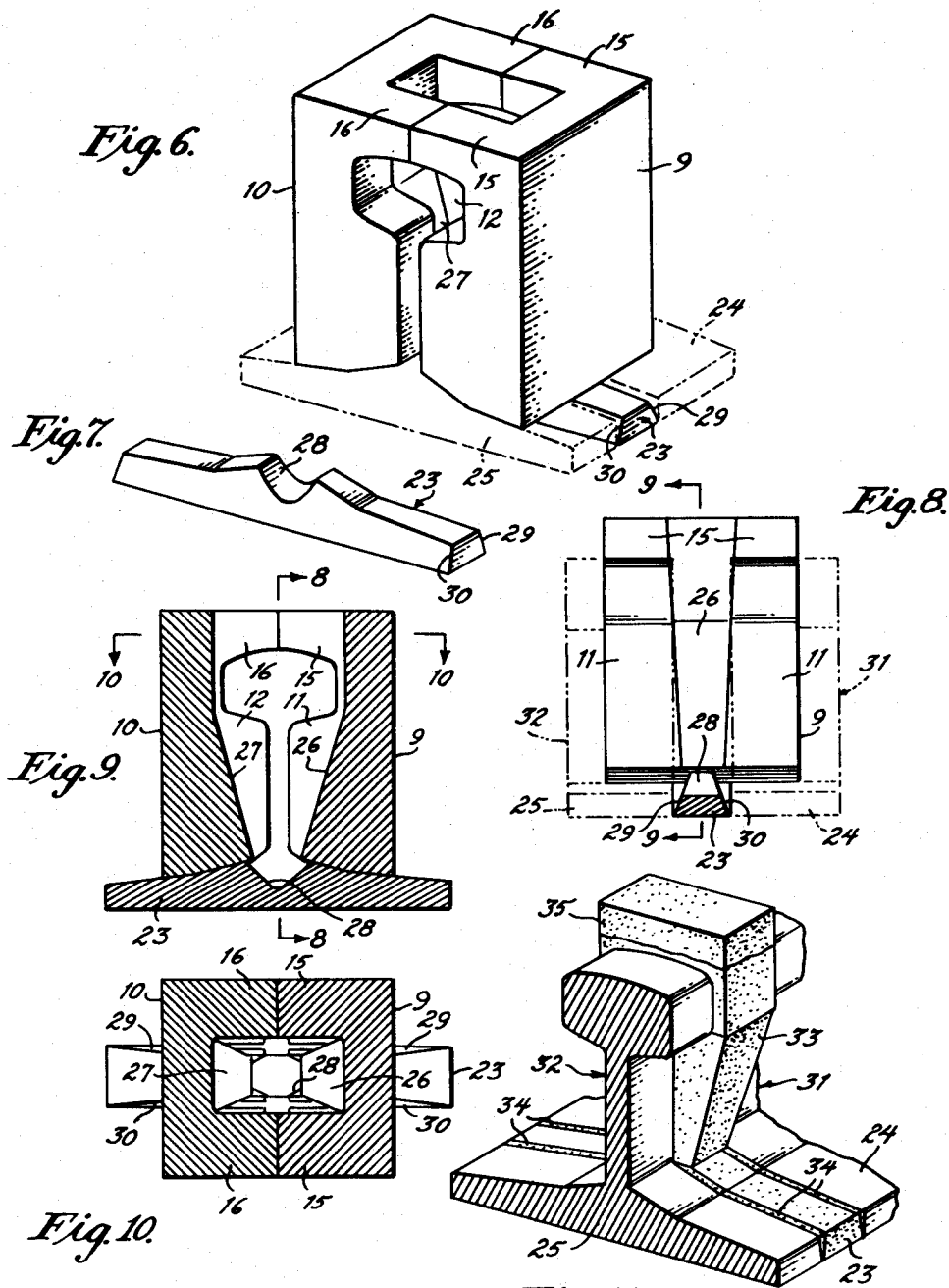

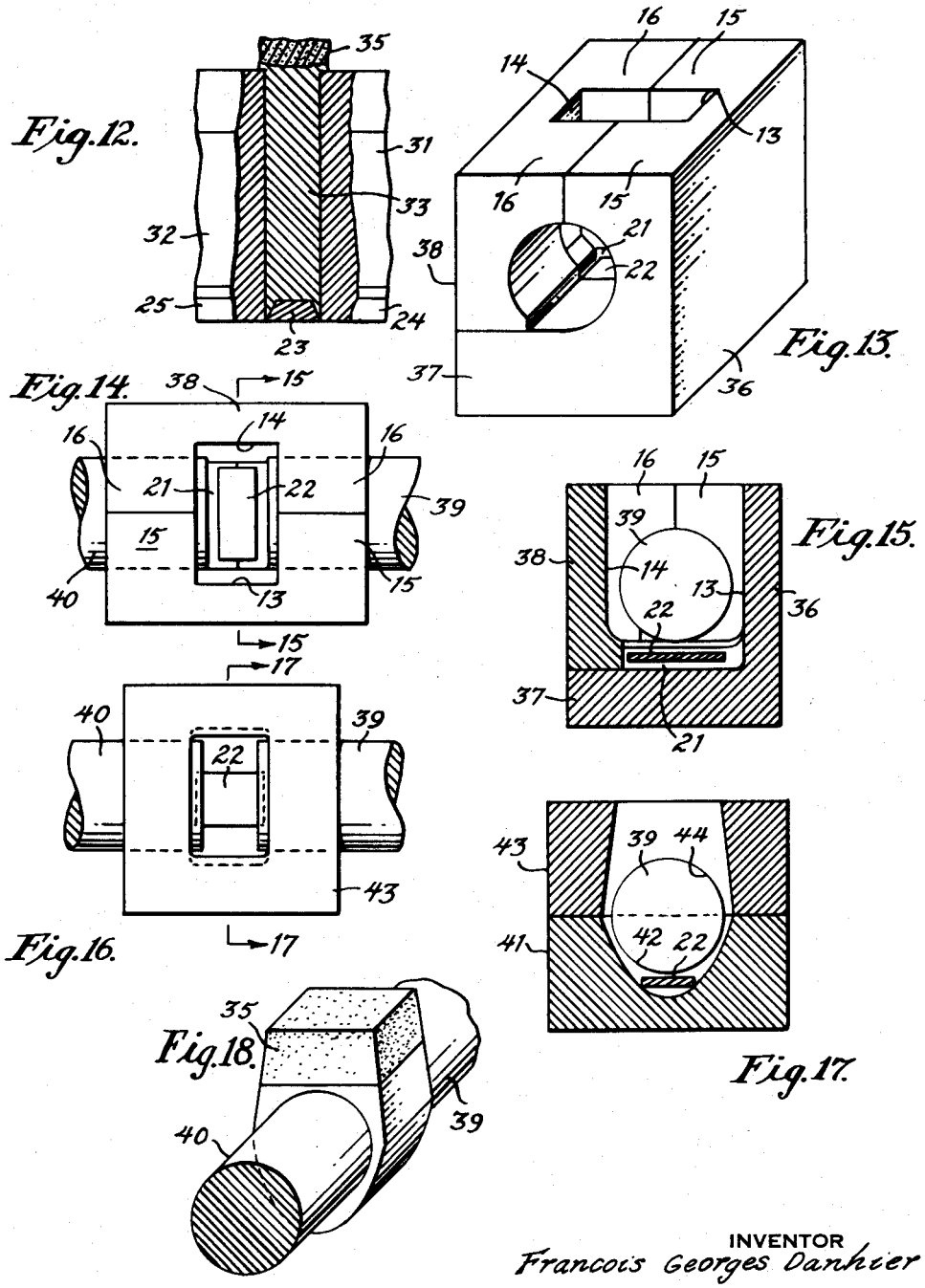

United States Patent Office 3,171,013
Patented Feb. 23, 1965

3,171,013
PROCESS AND APPARATUS FOR JOINING STEEL WORK BY AUTOMATIC AND SEMI-AUTOMATIC ELECTRIC ARC WELDING
François Georges Danhier, Uccle, Belgium, assignor to La Soudure Electrique Autogene, S.A., Brussels, Belgium, a corporation of Belgium
Filed Dec. 7, 1962, Ser. No. 243,146
Claims priority, application Belgium, Dec. 14, 1961, 487,637
1 Claim. (Cl. 219—137)

The present invention relates to a process for joining metal work pieces such as steel sections arranged in line with one another, by automatic or semi-automatic electric arc welding, in which the weld metal is deposited from bottom to top in a gap between the ends of the work pieces, while containing the metal in a mold formed by parts which engage the work pieces.

A purpose of the invention in joining steel work pieces arranged in line by automatic or semi-automatic electric arc welding is to place a mold which extends around the work pieces and extends upwardly substantially above the level of the work pieces and which overlaps the work pieces near their adjacent ends, to deposit weld metal adjacent the bottom of the mold by visible electric arc welding employing a bare metallic electrode fed in a continuous manner until the bottom of the work pieces have melted into contact with the weld pool maintained between the ends of the work pieces, to continue welding while progressively introducing flux into the mold until the upper surface of the molten slag thus produced has reached the lower end of the electrode, and then to continue welding by the Electroslag process until the deposited weld metal has reached above the level of the work pieces.

A further purpose in a process of the character described is to initially weld in the bottom of the mold under protection and without any slag protection until the lower portion of the work pieces have melted into contact with the weld pool, and then to continue welding by the Electrogas process while adding a small amount of flux to melt in the weld pool and then to add flux rapidly until the surface of the molten flux rises to the tip of the electrode and then to continue to weld with the Electroslag process.

A further purpose in a process of the character described is to provide a mold having a cavity below the gap between the ends of the work pieces and to place in that cavity before beginning to weld a strip of steel, and strike the arc at the beginning of welding upon that strip of steel.

A further purpose in welding of the character under discussion, where the work pieces are steel rails, is to place between the ends of the rails level with their flanges a steel foot piece having a longitudinal section which corresponds substantially to the cross section of the flanges of the rails, to weld the edges of the foot piece to the rail flanges, and to employ a mold which conforms with the sides of the rails above the foot piece, the sides of the mold widening progressively from the foot piece to the top of the heads of the rails, at which point the width of the cavity exceeds the width of the heads of the rails.

A further purpose in a process as just described is to provide a cavity at the middle of the foot piece in which the deposition of the weld metal begins.

A further purpose is to make a mold of metal which is not adherent to molten steel, which has end faces which conform to the sides of the work pieces, the end faces at the top having projections which overlap the work pieces when the mold is assembled.

In the prior art work pieces such as steel sections have been manually welded by the electric arc, for example steel rails, using welding electrodes provided with a slag producing coating. The weld pool and the molten slag have been contained by a mold, for example of copper, which in some cases has been cooled, and the ends of which connect the under face and the side faces of the work pieces, as far as the top of the work pieces.

This prior art process is relatively slow, not only because it is necessary to interrupt each time an electrode is consumed, but also because the layer of slag protecting the weld pool constantly increases in thickness during welding and must periodically be removed.

To overcome this difficulty, the suggestion has been made to provide slots between the work pieces and the abutting ends of the mold, through which the excess of slag resulting from the fusion of the coated welding electrodes can escape after it becomes fluid under the arc. This process, however, does not permit as rapid performance as if the slag would not require removal during welding.

In both manual welding processes mentioned, welding is therefore not completed before a large portion of the weld metal which is deposited has solidified, and before a sizeable quantity of heat has dissipated at a relatively long distance from the work piece. As a consequence, after welding is completed, cooling takes place relatively rapidly, with a tendency to quench the steel, especially in the case of high carbon steel as used for railroad rails.

The present invention is designed to remedy these defects.

In accordance with the invention, the process uses a mold having a top substantially above the upper level of the work pieces, and overlapping the work pieces near the parting surfaces of the mold, along with deposition of visible electric arc welding by a known process using a bare metallic electrode fed in a continuous manner between a suitable feeding means for the electric current, until the lower portion of the work pieces have melted in contact with the weld pool. Then as welding proceeds, flux is introduced in the mold until the upper surface of the molten slag has reached a point above the lower tip of the electrode, and welding is then continued using the prior art Electroslag process, until the weld deposited metal has reached a level higher than the top of the work pieces.

This process involves less heat dissipation in the work pieces because it can be performed much more rapidly. Moreover, the slag never interferes with welding since the visible arc process used at the start is replaced by the Electroslag process as soon as or almost as soon as the initial welding operation has melted the lower portions of the work pieces. Furthermore, the thick layer of slag covering the weld pool contributes to reduce the heat losses during welding. Finally, this same layer of slag reduces the rate of cooling of the weld after welding is completed. The process in accordance with the invention, therefore, makes it possible to accumulate a large amount of heat in the joint until the weld is completed, thereby assisting in avoiding a quenching effect on the ends of the work pieces.

In an alternate and preferable form of the process of the invention, welding at the bottom of the mold is started under gas protection, until the lower portions of the work piece have melted into contact with the weld pool. Then when continuing welding by the Electrogas process of the prior art, some flux is added to melt in the weld pool. Then flux is added rapidly to the slag which is already molten until the surface of the slag reaches the tip of the welding electrode, and thereafter welding is continued by the Electroslag process.

By way of explanation, it may be stated that the Electrogas procedure is a welding process using a visible arc under gas protection, which differs from the usual welding process under gas protection in the fact that the arc strikes between the electrode and a voluminous weld pool. The portions of the ends of the work pieces which are located above the weld pool, melt solely from heat radiated by the arc and by the pool, while on the other hand in the usual process with visible arc and gas protection, the arc strikes between the electrode and the small area on one or both work pieces, because the work pieces are much closer together.

In the particular case where rails are assembled end to end, it is desirable to introduce between the ends of the bases of the rails a steel foot piece having a longitudinal section corresponding substantially to the cross section of the rail base. The edges of the foot piece are first manually welded to the rails, and second welding is carried on by the Electroslag process, using a mold of such shape that a cavity tapering upwardly outward is provided at each side of the joint, from the bottom of the rail flange to the top of the rail head, the cavity being wider than the head of the rail at the top of the head.

This results in an increasing volume of liquid metal deposited by welding, transversely to the rail, with a corresponding progressive widening of the surface of the weld pool across the rails, as joining progresses from the thickness of the rail flange at the bottom to the width of the rail head at the top.

Preferably, the foot piece inserted between the rail flanges should have present at its middle a depression or cavity in which weld metal deposition is initiated after the edges of the foot piece have been butt welded to the rail flanges across the rails, from one side face of the mold to the other.

The invention also is concerned with the production of molds suitable for use in the process of the invention, made of a metal such as copper or bronze to which molten steel does not adhere, such parts being shaped to contact the side faces of the work pieces. The mold in accordance with the invention has at the top projections which overlap the work pieces when the mold parts are in the location for welding.

In a particular embodiment of the invention suitable for rail welding, the mold has a distance between opposed side walls which increases progressively from the bottom of the side walls to the top of the rail head where the gap exceeds the width of the rail head, with the side walls resting against the rail flanges as well as against the foot piece welded to the flanges and having a longitudinal section corresponding substantially to the cross section of the rail flanges. Preferably, the foot piece will have a cavity in the middle of its length, and its long edges will be advantageously chamfered inwardly.

Other features of the invention will appear in the course of the description of the drawings below which illustrate schematically, by way of example only, several embodiments of the invention.

FIGURE 1 is a perspective, partially broken away, of a mold for welding two bars of square cross section, one of which is shown in solid lines in the drawing, while the other is illustrated in dot-and-dash lines at the position it will occupy in welding to aid in understanding the structure.

FIGURE 2 is a longitudinal section of the mold of FIGURE 1, before welding has started, the section being taken on the line 2—2 of FIGURES 3 and 5.

FIGURES 3 and 4 are transverse sections of the mold of FIGURES 1 and 2, the sections being taken respectively on the lines 3—3 and 4—4 of FIGURE 2.

FIGURE 5 is a plan view of the mold of FIGURES 1 to 4, inclusive.

FIGURE 6 is a perspective of a mold for welding rails, the rails being shown only by the illustration of their flanges in dot-and-dash lines, the rest of the rails being broken away for convenience in illustration.

FIGURE 7 is a perspective of a steel foot piece of the type illustrated at the bottom of FIGURE 6.

FIGURE 8 is a longitudinal section of the mold of FIGURES 6 and 7, the section being taken on the line 8—8 of FIGURE 9, with the ends of the rails shown in the position which they will occupy in FIGURE 8 before welding has begun, but illustrated in dot-and-dash lines to aid in understanding.

FIGURE 9 is a transverse section on the line 9—9 of FIGURE 8.

FIGURE 10 is a horizontal section on the line 10—10 of FIGURE 9.

FIGURE 11 is a perspective of two short pieces of rail after they have been welded together and after the mold side walls have been removed.

FIGURE 12 is a longitudinal vertical section of the rail assembly of FIGURE 11.

FIGURE 13 is a perspective of a mold suitable for use in welding concrete-reinforcing bars.

FIGURE 14 is a plan view of the mold of FIGURE 13 showing two concrete-reinforcing bars inserted at the mold prior to joining.

FIGURE 15 is a section on the line 15—15 of FIGURE 14.

FIGURE 16 is a plan view of a variant form of mold for welding concrete-reinforcing bars, with two bars inserted prior to joining.

FIGURE 17 is a transverse section on the line 17—17 of FIGURE 16.

FIGURE 18 is a perspective of the completed joint as produced by the mold of FIGURES 16 and 17, the mold being removed.

In the drawings like numerals identify like parts.

The mold of FIGURES 1 to 5, inclusive, is suitable for welding square bars 2, 3 of low carbon steel, which in a particular example might have a width of between 1¾₆ inches and 4 inches. These bars are aligned with one another end to end. The end faces 4 and 5 of the bars are perpendicular to the longitudinal axes and are suitably spaced apart by a distance which in a particular example may be 1.1 inches. These bars rest upon a bottom 6 of the mold. The bottom 6 is made of copper, bronze, or any other metal or alloy to which molten steel will not adhere. A passage 7 in the interior of the bottom piece is connected to two fittings 8 to be joined to liquid coolant connections. Two other copper or bronze mold sides 9 and 10 contact bottom 6 and the square bars 2 and 3 by their end faces 11 and 12, respectively. Between the end faces 11 of side 9 and between the end faces 12 of the side 10, there are grooves 13 and 14 which align with the gap between the end faces of the square bars. The upper portions of the sides 9 and 10 extend substantially above the work bars when the mold is assembled and are provided with projections 15 and 16 which extend above the work bars and abut to form parting faces. The sides 9 and 10 also have passages 17 and 18 which communicate with connections 19 and 20 to circulate a liquid coolant.

In the center portion of bottom 6 of the mold, a cavity 21 has been provided which has a V-shaped groove, which is therefore located at the bottom of the gap which is to receive the weld between the ends of the work bars 2 and 3. Before beginning to weld a steel strip 22 is laid in this groove, and the arc will be struck on this strip to avoid damaging the mold bottom 6. This strip remains in the weld metal which will flow to the bottom of the groove.

Welding is carried on with an automatic or semi-automatic machine, using a continuous electrode fed without interruption and having a bare metallic surface. Welding may proceed, for example, under protection of a suitable gas such as carbon dioxide.

With that purpose in mind, the gap between the work bars 2 and 3 and the sides 9 and 10 of the mold is purged of air by a stream of gas suitably carbon dioxide coming from above. This jet is maintained during the entire period of welding. A gas output of about 25.5 cubic feet per hour has been found to be adequate. The welding gun in the case of semi-automatic welding or the welding nozzle in the case of automatic welding, may desirably deliver a ⅛ inch electrode designed to operate either under a visible arc with gas protection, or for use in welding under molten slag. In the case of automatic welding, the nozzle is capable of swinging in the gap between the work bars. The nozzle is preferably insulated electrically on its outer surface.

After the arc is struck on strip 22 as explained above, and therefore after a small amount of weld metal has been deposited by the visible arc process, the operator traverses the tip of the electrode along the lower edges of work bars 2 and 3 so as to fill the portions of groove 21 adjacent to the work bars with weld metal, running back and forth along said cross edges at the bottoms of the work bars.

The weld pool which accumulates in the bottom 6 of the mold radiates heat toward these cross edges and reaches them rather rapidly, for instance within 60 to 90 seconds of the beginning of the welding.

During this weld deposition, the welding process used is the Electrogas process. Optionally a small amount of ionizing easily fusible flux can be added to the weld pool at this stage to facilitate wetting the work bar surfaces when contacted by the pool. This slag also has a favorable metallurgical action on the molten weld metal. This addition of flux is made, either directly by hand or by using a continuous welding electrode of the metallic tubular type having a core of flux. The flux used under these conditions is preferably of the basic type which contains, among other ingredients calcium carbonate and calcium fluoride.

As soon as the bottom portions of the work pieces 2 and 3 have fully melted under the Electrogas process, the operator maintains the arc lit and traverses the electrode back and forth in the mold parallel to the end faces of the work bars, and at the same time pours into the mold cavity an anhydrous granulated flux in such quantity as to produce by its fusion about 20 cubic centimeters of liquid slag for work bars which are about 2 inches wide and correspondingly more or less where the work bars vary from this dimension. This quantity of flux is then sufficient to have the surface of the liquid slag reach the tip of the electrode before the flux is completely melted, assuming that the electrode is held at a distance above the molten weld pool suitable to maintain the arc before pouring the flux. As soon as the tip of the electrode is surrounded by molten slag in contact with the tip, the welding current passes from the electrode to the work bars, through said liquid slag, which further heats up the weld. The electric arc thus disappears and welding continues using the Electro-slag process.

The pool of liquid weld metal rises and its lower portion solidifies. The pool is contained laterally by sides 9 and 10 of the copper mold. Some of the slag penetrates between the walls and the mold of the solidified steel of the weld.

The flux used may be of any desired composition, as long as it is suitable for use in the Electroslag process. The preferred flux is a granulated manganese silicate.

The basic slag used at the beginning of the operation and optionally the one which continues to be fed with the flux cored electrode, dissolves in the great mass of slag fed by the granulated flux added constantly during the Electroslag process operation. Due to the ratio of amounts present, this basic slag does not affect appreciably the properties of the manganese silicate during the entire operation of Electroslag welding. After 5 or 10 minutes of welding, depending on the welding current and the voltage used (a suitable current and voltage being for example 650 amperes and 32 volts), the surface of the liquid weld metal reaches a level above the surface of the top of the work bars to an extent of about 5/64 inch. This liquid metal is covered by a layer of liquid slag which by that time will suitably have attained a thickness of about one inch. At this point, the operator stops the traverse motion of the electrode when the electrode is in the middle of the joint and retracts the electrode from the molten slag to stop the welding operation.

The operator then allows the weld metal to solidify completely, after which he removes the bottom 6 and the sides 9 and 10 of the mold. The weld reinforcement is then removed.

Even though the use of gas protection before converting to Electroslag welding is a preferred procedure in the process of the invention, the start of the operation and the deposit of weld metal up to fusion of the lower portion of the work pieces can also be accomplished without gas protection. For example, welding can begin with a visible arc using a flux cored electrode depositing enough slag to cover the weld pool until conversion to the Electroslag process can occur.

The process as per the invention is particularly advantageous to join rails of high carbon steel because it maintains a large volume of very hot liquid metal until the end, and because it permits slow cooling of the joint after completion of welding.

To weld railroad rails, a mold of the type shown in FIGURE 6 to 10 will desirably be used. The bottom of the mold consists of a foot piece 23 of steel, having a longitudinal section corresponding substantially to the cross section of the rail flanges. The rail flanges are shown in part by dot-and-dash lines and are referred to at 24 and and 25 in FIGURE 6. The foot piece 23 of steel cannot be considered a part of the mold, except before welding, because after completion of the joint it remains part of the joint between the rails as explained hereafter.

The sides 9 and 10 of the mold are made of copper or bronze as described in connection with FIGURES 1 to 5. Their end faces 11 and 12 contact the lateral faces of the rails to be joined, and rest upon the rail flanges. They possess upper projections 15 and 16 which overlap the rail heads. The internal faces 26 and 27 of the sides 9 and 10, located between the end faces 11 and 12, spread apart progressively from the lower edge of the side walls, at the level of foot piece 23 and of rail flanges 24 and 25, up to the top level of the rail heads where their gap exceeds the width of the rail heads.

The foot piece provides a cavity 28 in the middle of the bottom. Both longitudinal faces 29 and 30 of the foot piece are chamfered toward each other.

To weld two rails 31 and 32 shown by dot-and-dash lines in FIGURE 8, their flanges 24 and 25 are placed in alignment abutting against the steel foot piece 23 which has a width corresponding to the gap which it is desired to leave between the rail ends, for example 1 3/16 inches. Foot piece 23 is joined to the flanges 24 and 25 by fillet welds 34 which fill the formed groove between the chamfered face 29 and 30 of the foot piece and the end faces of the rails 31 and 32.

The fillet welds deposited in these grooves should preferably be made under gas protection, for example by carbon dioxide. The junction of the foot piece 23 to the weld flanges 24 and 25 is made optionally by hand welding with electrodes having basic coatings. Side walls 9 and 10 are laid on these flanges and on this foot piece, contacting the contour of the rails and the rail heads. Later, weld metal is deposited by automatic or semi-automatic welding starting at the bottom of the cavity 28 in the middle of the foot piece 23. A weld pool is thus quickly obtained by the Electrogas process which is used for instance until the weld pool reaches the bottom of the rail web. Then welding is continued by the Electroslag process, pouring flux into the mold in a manner similar to the one hereinabove described for welding square work pieces.

The progressively upward widening of the internal faces 26 and 27 of the mold results in a bulky joint 33 which is advantageous to reduce quenching effects when the joint cools off, after the weld metal has risen about 5/64 inch above the top level of the rails, under a thick cover of molten slag.

After solidification of the weld metal, the rail flanges and heads are joined by the weld 33, which, as shown in FIGURE 11, substantially resembles the shape of an inverted truncated pyramid with its small base at the bottom of the rail webs. After removing the side walls of the mold and the cooled slag 35, the weld reinforcement above the top level of the rails is machined away.

The mold of FIGURES 13 to 15 has two sides of copper or bronze, one of which, 36, is integral with the bottom 37 upon which the other side 38 rests. These two sides have at their tops projections 15 and 16 extending toward one another and overlapping round bars such as concrete reinforcing bars 39 and 40 to be welded. To weld these bars, the operation is performed exactly as described above for welding square bars. After welding for 15 to 30 seconds, the molten weld pool reaches the lower portion of the bars and conversion to the Electroslag process takes place while adding granulated flux as the arc is maintained.

The mold, as shown in FIGURES 16 and 17, includes a cup 41 provided with grooves 42 to receive a portion of the ends of work bars 39 and 40. This cup is covered with a ring 43 also having grooves 44 which receive the remainder of the work bars which are not fitted in grooves 42 of the cup. At the bottom of the cup a metallic strip 22 is placed to facilitate striking the arc. When welding has been completed, the assembly appears as shown in FIGURE 18.

In view of my invention and disclosure, variations and modifications to meet individual whim or particular need will doubtless become evident to others skilled in the art to obtain all or part of the benefits of my invention without copying the process and structure shown, and I, therefore, claim all such insofar as they fall within the reasonable spirit and scope of my claim.

Having thus described my invention what I claim as new and desire to secure by Letters Patent is:

A process for joining steel rails by welding, which comprises placing between the ends of the rails level with their flanges a steel foot piece having a longitudinal section which corresponds substantially to the cross section of the flanges of the rails, arc welding the edges of the foot piece to the rail flanges, placing on the foot piece and on the rail flanges, near the bottoms of the rail webs, two half molds which widen progressively upwardly away from the webs of the rails and outwardly away from the heads of the rails at the level of the rail heads, said half molds extending upwardly substantially above the rail heads and having end faces which conform to the webs and to the heads of the rails on either part of the joint to be welded, and depositing welding metal in said mold by the Electroslag process until the deposited metal has reached a point above the level of the heads of the rails.

References Cited by the Examiner

UNITED STATES PATENTS

| | | | |
|---|---|---|---|
| 1,643,227 | 9/27 | Stresau | 219—160 X |
| 2,348,087 | 5/44 | Miller | 219—73 X |
| 2,469,062 | 5/49 | Begtrup | 22—116 |
| 2,824,952 | 2/58 | Zoethout | 219—137 |
| 2,950,377 | 8/60 | Thomas | 219—74 |
| 2,997,571 | 8/61 | Smout | 219—137 X |

RICHARD M. WOOD, *Primary Examiner.*

JOSEPH V. TRUHE, *Examiner.*